(12) United States Patent
Lawrence

(10) Patent No.: US 6,984,995 B2
(45) Date of Patent: Jan. 10, 2006

(54) DEVICE TO AUDIBLY EXPRESS IMPENDANCE MEASUREMENT

(76) Inventor: Clifton Lawrence, 150 Buccoo Shirvan Road, Buccoo, Tobago (TT)

( * ) Notice: Subject to any disclaimer, the term of this patent is extended or adjusted under 35 U.S.C. 154(b) by 22 days.

(21) Appl. No.: 10/362,694

(22) PCT Filed: Aug. 29, 2001

(86) PCT No.: PCT/TT01/00001

§ 371 (c)(1),
(2), (4) Date: Sep. 8, 2003

(87) PCT Pub. No.: WO02/18957

PCT Pub. Date: Mar. 7, 2002

(65) Prior Publication Data

US 2004/0057583 A1 Mar. 25, 2004

(30) Foreign Application Priority Data

Aug. 30, 2000 (TT) ................................................ 00116

(51) Int. Cl.
*G01R 27/08* (2006.01)

(52) U.S. Cl. ...................... 324/706; 324/713; 324/725
(58) Field of Classification Search ................ 324/610, 324/705, 706, 713, 725; 703/13
See application file for complete search history.

(56) References Cited

U.S. PATENT DOCUMENTS

| 4,004,223 A | 1/1977 | Cohen ......................... 324/62 |
| 4,160,206 A | 7/1979 | Bojarski ....................... 324/73 |
| 4,322,679 A | * 3/1982 | Moore et al. ................ 324/706 |
| 4,549,147 A | 10/1985 | Kondo ......................... 330/297 |
| 5,068,618 A | * 11/1991 | Fry et al. ..................... 324/706 |
| 5,272,445 A | 12/1993 | Lloyd et al. ................. 324/706 |

FOREIGN PATENT DOCUMENTS

| DE | 4340831 | 6/1995 |
| FR | 2700394 | 7/1994 |
| GB | 2076165 | 11/1981 |

* cited by examiner

*Primary Examiner*—Anjan Deb
*Assistant Examiner*—Timothy J. Dole
(74) *Attorney, Agent, or Firm*—Baker Botts LLP

(57) ABSTRACT

An Audio Feedback Impedance Comparison Device to audibly express Impedance differences between/amongst components, circuits, materials, substances etc., to make use of the aural sense, while relieving eye, neck and mental strain, as well as reduce probe time. This is achieved by allowing simultaneous yet focused attention to be paid to all aspects of an impedance probe, i.e. hand-eye coordination of probe positioning, while aurally monitoring the feedback, instead of the common practices/methods where eyes have to be re-focused on visual feedback devices. The use of an alternating signal allows "through" comparison, where multiple components some of which are impervious to static signal, contribute to overall impedance. The device can be used to inject and/or detect/trace the presence of an audio signal in an active circuit. With the aid of transducers, this Device may be used with other forms of energy.

7 Claims, 13 Drawing Sheets

DEVICE TO AUDIBLY EXPRESS IMPENDANCE MEASUREMENT

BACKGROUND OF THE INVENTION

Figure 1:
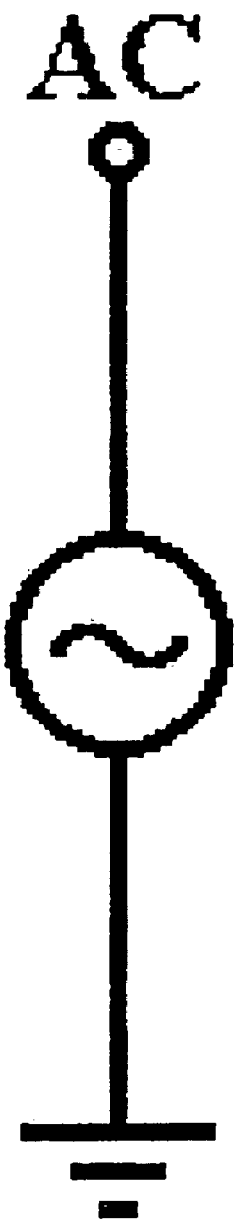

This Invention is as a result of a quest to find a cheap, simple and effective way to troubleshoot malfunctions due to Impedance change, since component failure is usually reflected as such.

DESCRIPTION OF PRIOR ART

In Electronics, the current method of troubleshooting is generally to verify that individual components within a circuit retain their rated manufactured properties. The various properties usually require different methods and sometimes full or partial removal/isolation, to obtain accurate measurements. The Test Equipment most commonly used to verify component properties is the multi-meter, and since most multi-meters operate with a D.C. test Signal, they are unable to check Reactive Impedances. The main feedback from Multi-meters is visual, therefore using a Multi-meter requires firstly, visual attention in the positioning of the probes, then, refocusing on a display to read a value. Comparison between two circuits requires either two multi-meters, or checking and recording each reading. Testing is sometimes also done using a signal generator and oscilloscope. This method, though very effective, requires two pieces of equipment, still uses visual feed back and is relatively expensive. These current methods are not primarily geared for comparison. Comparisons are usually done as a choice of method by the investigator.

Some prior art systems include U.S. Pat. No. 5,272,445 to Lloyd et al. in which is disclosed a portable resistance tester comprised of a pair of DC regulator circuits used to drive a bridge circuit and a detector circuit, when measuring the resistance of "in-circuit" test nodes. The tester uses the passage of Direct Current to determine when the resistance of a measured test node falls within or without a predetermined resistance range. This said invention therefore, relates to testing of resistance and more specifically, to a tester for measuring/referencing resistance values only, with a binary output, as distinct and apart from the functions of the present invention which measures impedance in its totality, within or without of any given circuit.

German Patent No: DE 4,340,831 to Taco-Tafel GMBH, yet another invention employing a bridge circuit and a DC signal, relates to measurement, either of component resistance or of resistance formed at contact points in networks, with audio/visual indicators, where the audio indicator, is a tone whose frequency varies inversely with the resistance being tested. Again as aforementioned, the test signal is DC, which is capable only of measuring resistance.

Final reference is made to U.S. Pat. No. 4,004,223, to Cohen relating to a resistance or voltage tester for producing an audible tone that varies inversely with resistance or voltage. The device comprises an audible wide range resistance and medium range voltage tester in the form of a rectangular small box designed to fit into a shirt pocket. The tester includes a speaker driven by low current logic gates and a transistor. The frequency of the speaker varies inversely proportional to the measured resistances ranging from zero to over 50 Meg Ohms and also inversely proportional to the voltage measured. In particular cases, the device can also be used as an audio signal source and with the use of a suitable probe, the voltage range can be increased to +400V DC or 260V AC. Again, the impedance test signal is DC which limits the test to resistance only.

In summary therefore, demonstrably, as can be seen clearly in the prior art, none of them employ AC as their test signal and therefore explicitly do not address the fundamental operational principle of contemporary impedance measurement testing of electrical or electronic devices or systems, since in their given previous and current modus operandi, AC is employed for use only as a mere indicator. It is even further more abundantly clear, that by employing DC as their test signal, none of the existent prior art devices, have to date even remotely addressed the concept of a systemic electronic device, which provides for impedance measurement. By employment of AC as its test signal and an external reference, this preferred electronic systemic device of the present invention, measures all aspects of impedance including resistance and indicates the measure of impedance via sound.

SUMMARY OF THE INVENTION

The Invention uses analog components in this digital era, to quickly isolate faults even in these modern digitized pieces of equipment.

DESCRIPTION OF THE INVENTION

The Operation of the Dynamic Impedance Comparator is explained using the following thirteen (13) diagrams.

FIG. 1. An Audio Frequency Voltage Generator called 'AC', whose Output is applied to the points labeled 'In', in Figure two (2) through Figure six (6).

Figure 2:
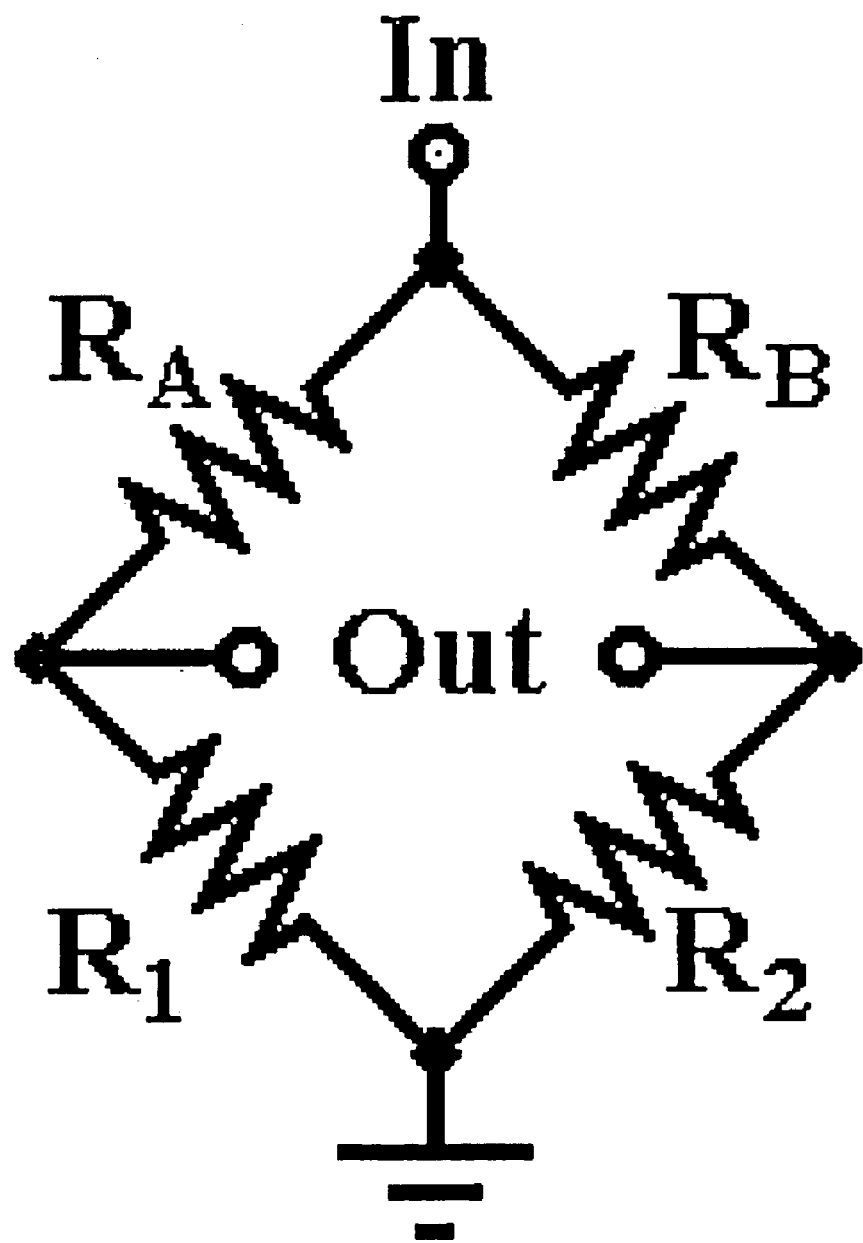

FIG. 2. (The Fundamental Circuit). A Resistive Bridge where 'R1' equals 'R2', and 'RA' and 'RB' are of unknown value. 'R1' and 'R2' also act as current limiters in the Circuit. Any difference in the Resistances of 'RA' and 'RB', causes a Voltage to be present across the points labeled 'Out'. The Circuit can be said to consist of two halves. One consisting of 'RA' and 'R1', and the other consisting of 'RB' and 'R2'.

NB. If any Measuring Device were to be connected across the terminals labeled 'Out', the power drawn by this Device, would change the Voltage across these terminals, hence the following configuration.

Figure 3:
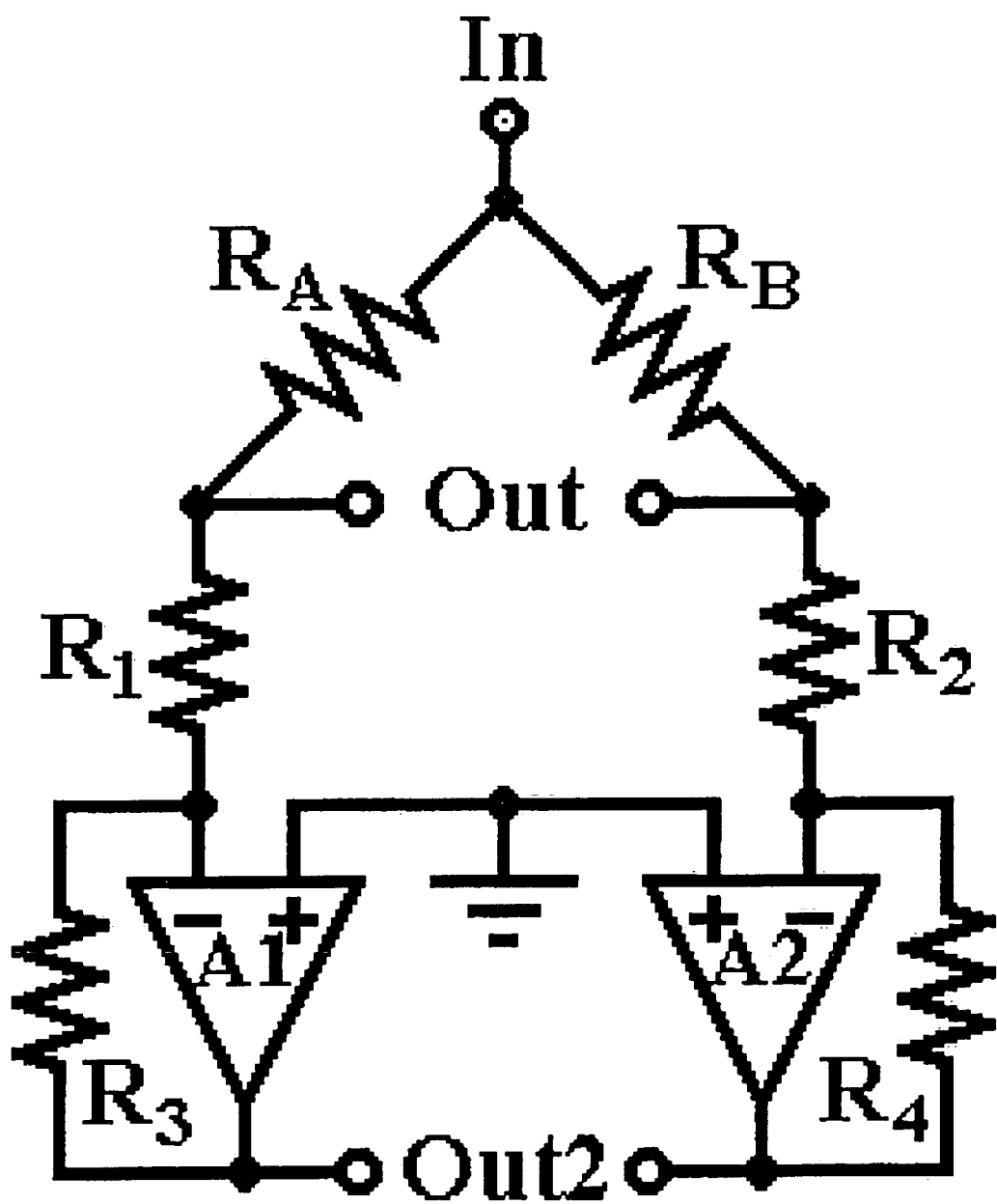

FIG. 3. Operational Anplifiers (Op-Amps) 'A1' and 'A2', and Resistors 'R3' and 'R4' with resistances equal to 'R1' and 'R2', are now added to FIG. 2. The Op-Amps are configured as Unity-Gain Inverting Amplifiers, with the positive (+) inputs grounded, and 'R1' and 'R2' used as the Inputs. The physically grounded points of 'R1' and 'R2' in FIG. 2., are now virtually grounded at the union of the Negative (−) Input of 'A1' and 'R3', and the union of the Negative (−) Input of 'A2' and 'R4' respectively. The Output at the terminals labeled 'Out2' between the union of 'R4' and the Output of Op-Amp 'A2', and the union of 'R3' and the output of Op-Amp 'A1', is equal in phase and magnitude to output at the terminals labeled 'Out2' between the union of 'RA' and 'R1', and the union of 'RB' and 'R2' respectively.

Figure 4:
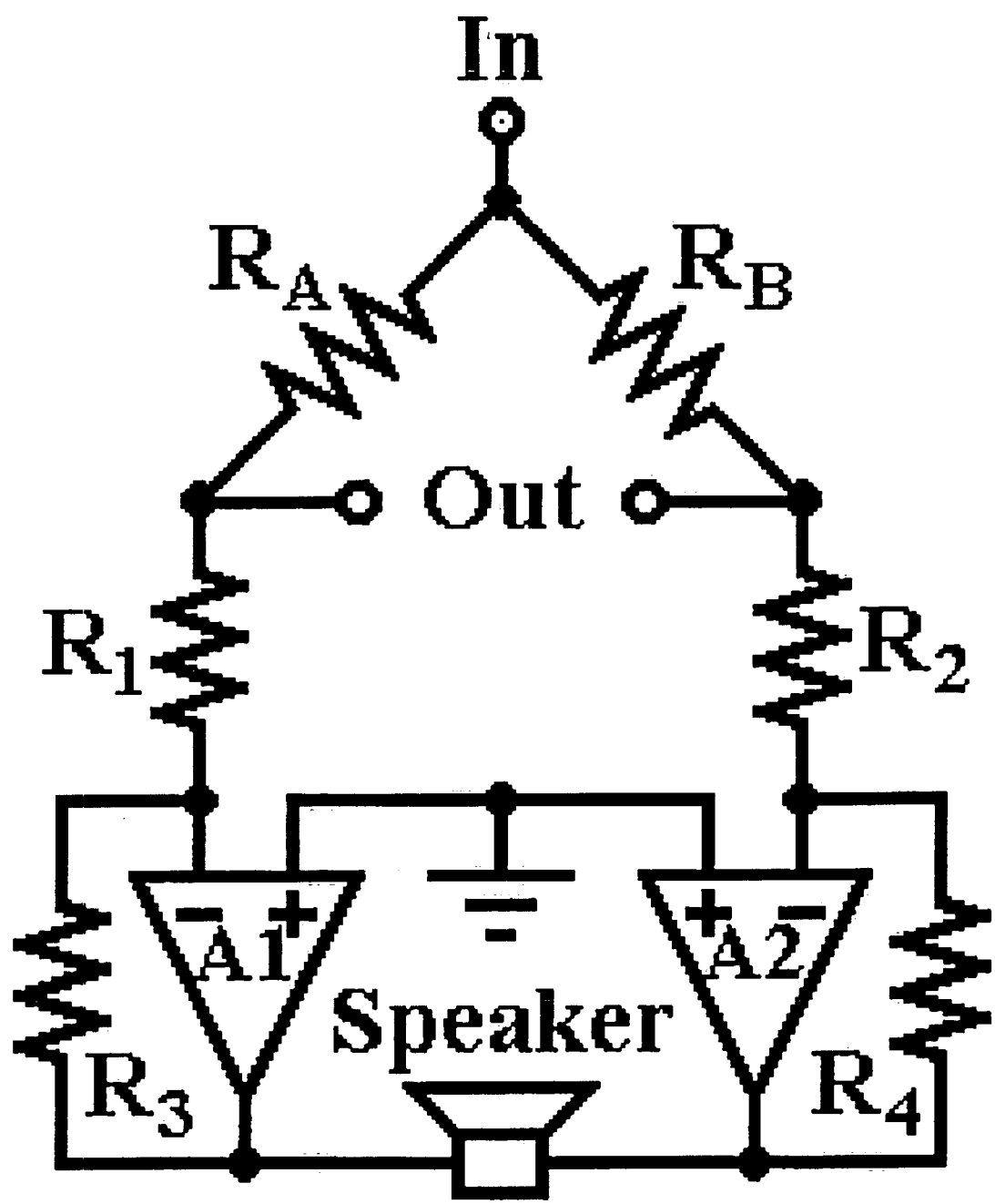

FIG. 4. The Outputs of the Op-Amps labeled 'Out2' in FIG. 3. is now connected to a Sound Reproduction Device labeled 'Speaker'. Any Difference in the Resistance between 'R1' and 'R2' can now be "heard".

Figure 5:
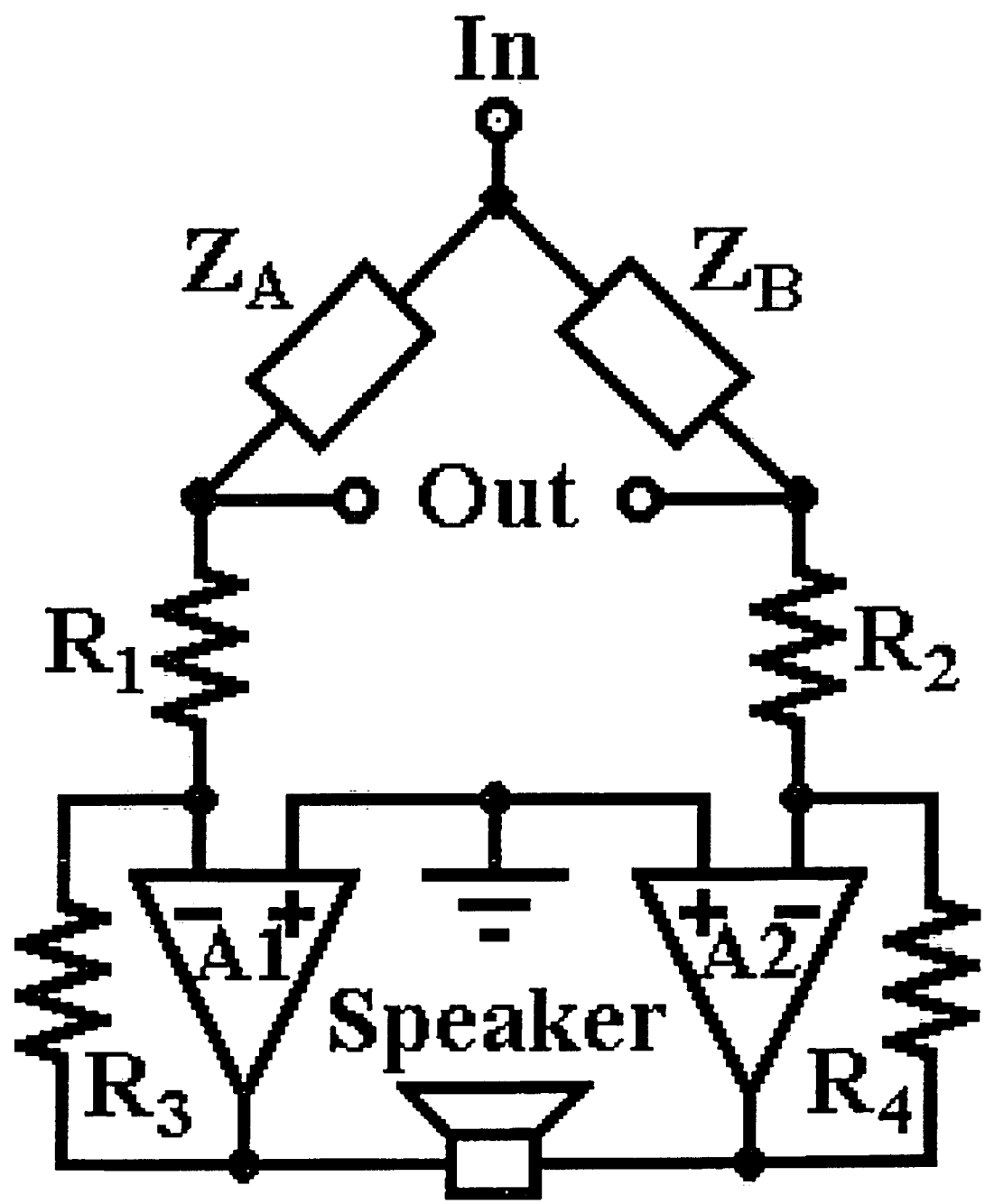

FIG. 5. When Resistances 'RA' and 'RB' in FIG. 3. are replaced with Impedances 'ZA' and 'ZB', which may comprise of Resistive, Capacitive, Inductive or Semi-Conductive properties of Electronic or Electrical Circuits or Components, or reflections of the electrical properties such as resistance dielectricity, magnetic permeability of substances or materials, Impedance Differences are made audible.

Figure 6:
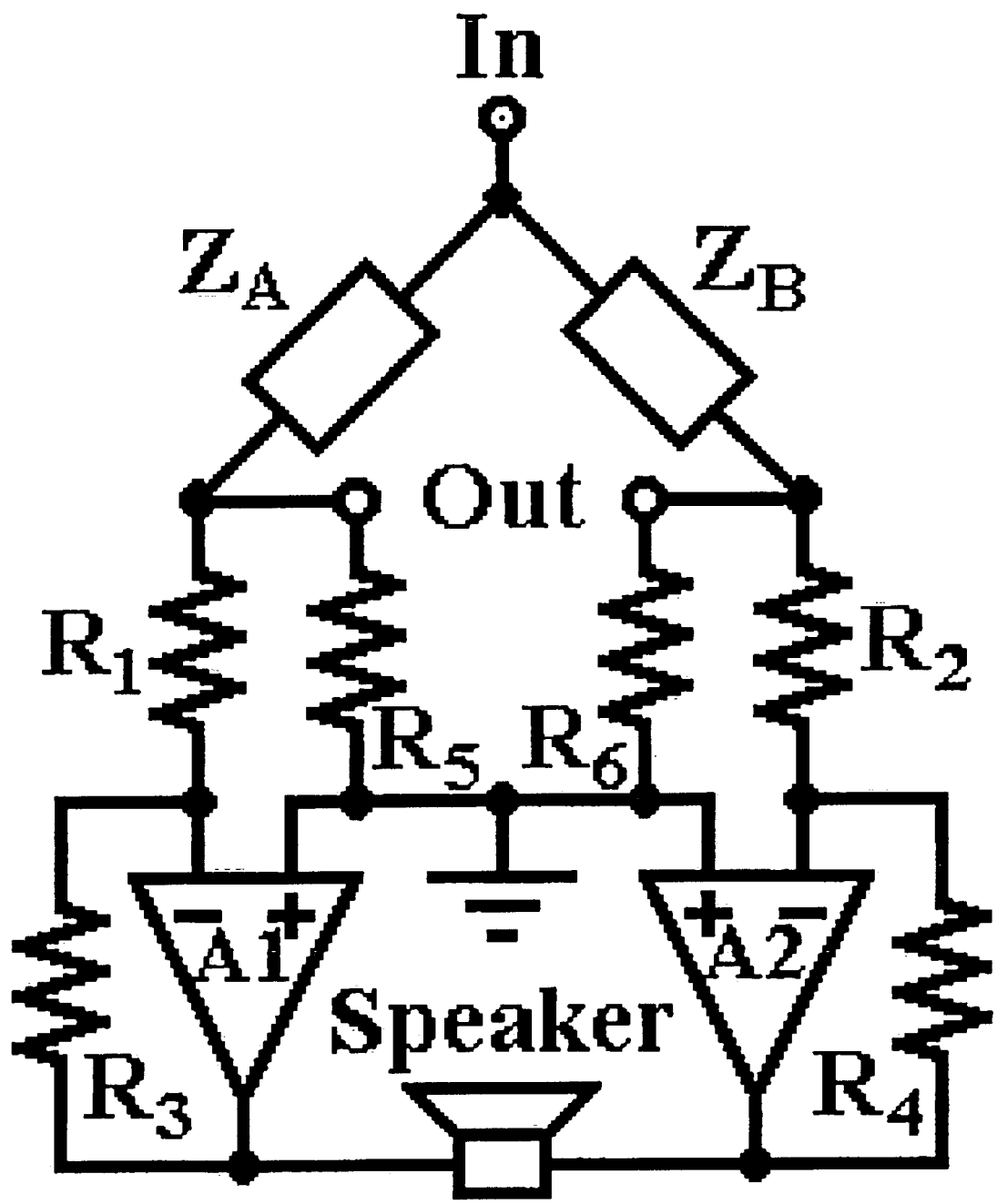

FIG. 6. The addition of equal resistances 'R5' and 'R6' to FIG. 5., allows for increased currents through the Impedances 'ZA' and 'ZB' respectively, without increasing the currents through the Op-Amps, yet still producing a voltage across the speaker, equal to that across the 'separate' terminals of 'ZA' and 'ZB'.

Figure 7:
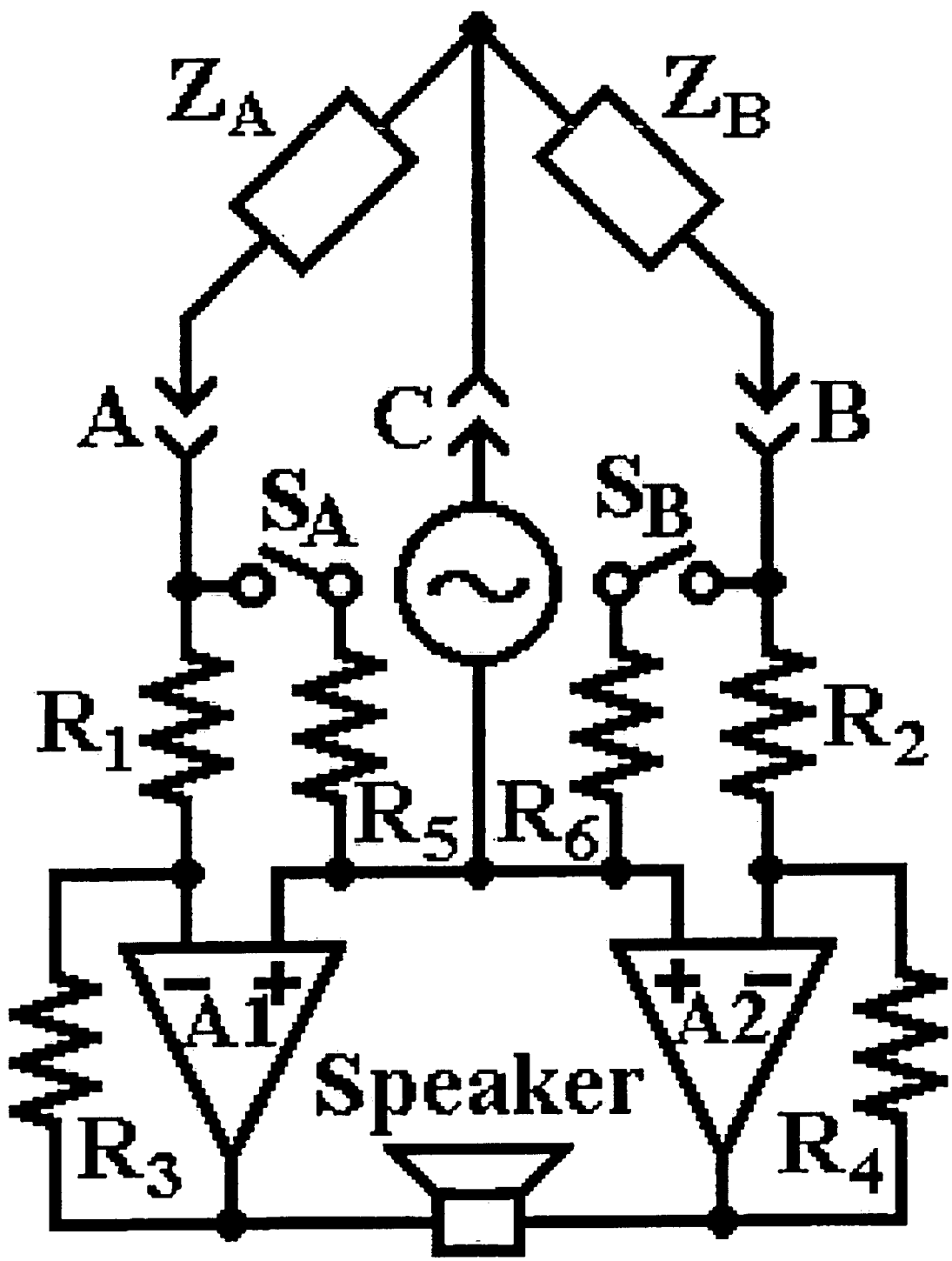

FIG. 7. The Unknown Impedances 'ZA' and 'ZB' in FIG. 6. have now been separated from the rest of the circuit. The Point of union (labeled 'In' in FIG. 6) of the Unknown Impedances, and the free ends of the Unknown Impedances provide three (3) terminals. FIG. 1. is now integrated into the rest of the circuit eliminating the need for Ground, which was being used as a reference to unite FIG. 1., to FIG. 2. through FIG. 6. 'R5' and 'R6' have been made selectable by adding Ganged Switch 'SA', 'SB'. The connector labeled 'C' (Common), previously called 'AC', together with connectors labeled 'A' and 'B' at the free ends of 'R1' and 'R2' respectively also provide three (3) terminals. These are the Terminals of this (Basic Version) Test Device called the Dynamic Impedance Comparator. NB. The ratio of the values of the Resistors 'R1' to 'R4', though introduced as equal, along with the Values of 'R5 and R6', can be varied or even replaced with complex Impedances or an Impedance network to 1. accommodate proportional impedances, or
2. vary the gain of the amplifiers to increase or decrease sensitivity.

The Op-Amps may also be replaced with High Voltage/Power Frequency Amplifiers 'Amps', functioning in the same manner, and retaining the labels 'A1' and 'A2', for Industrial Applications. The 'Speaker' may also be isolated from the Circuit as necessary. This concept is only demonstrated using electricity and electrical impedance. However, impedances to other forms of energy e.g. sound, motion, light etc., can be monitored and compared by energy conversions/adaptations some of which are stated below. When the Energy produced by 'AC' is in the form of sound, motion, light etc., appropriate transducers may be used to convert the energy flow, or reaction to this energy, to Sound.

FIGS. 8 through 13 illustrate modifications to accommodate various Unknown Impedance and/or Configurations.

Figure 8:
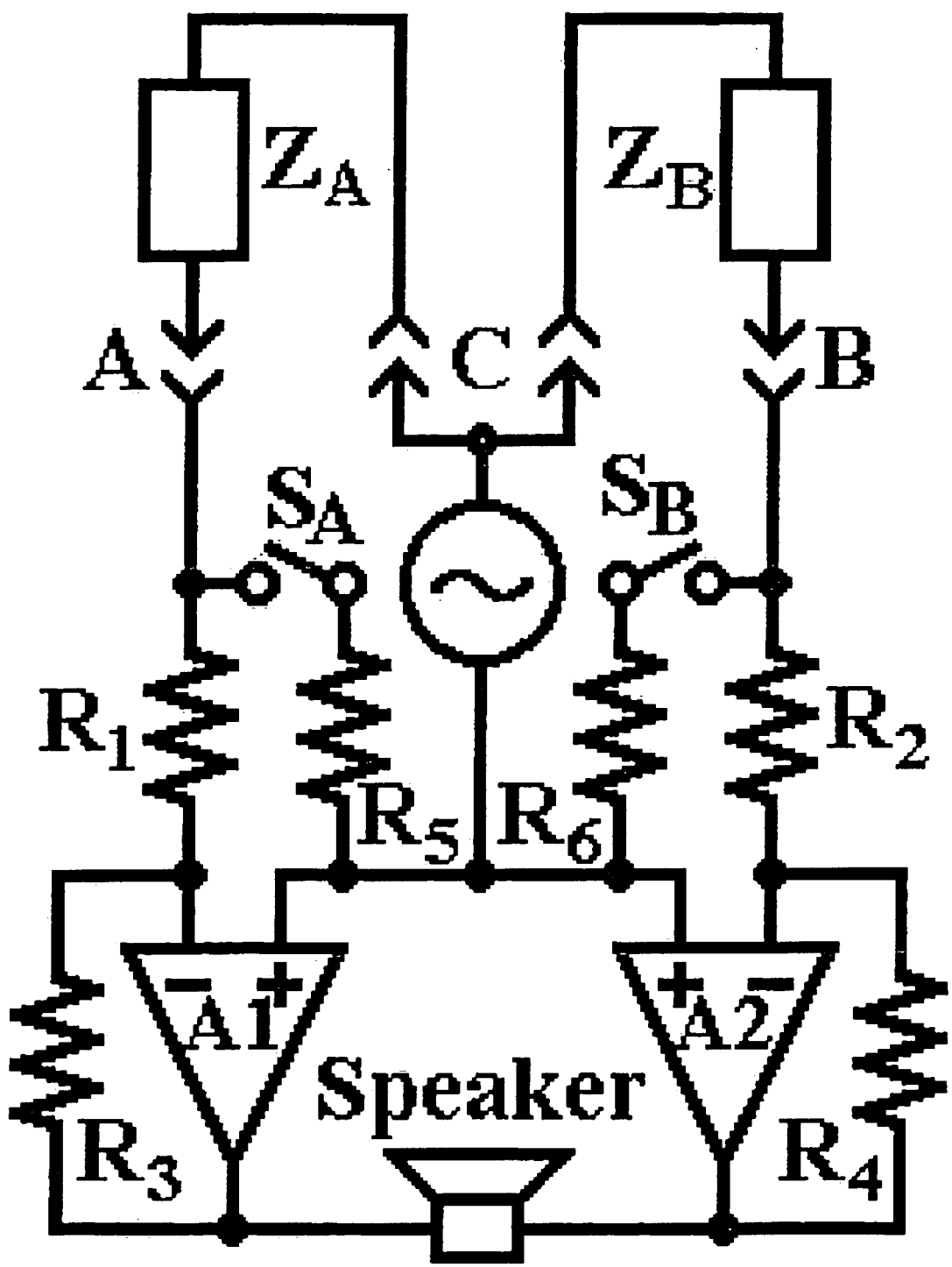

FIG. 8. Connector 'C' is split to two terminals, to provide for comparison of Separate Impedances.

Figure 9:
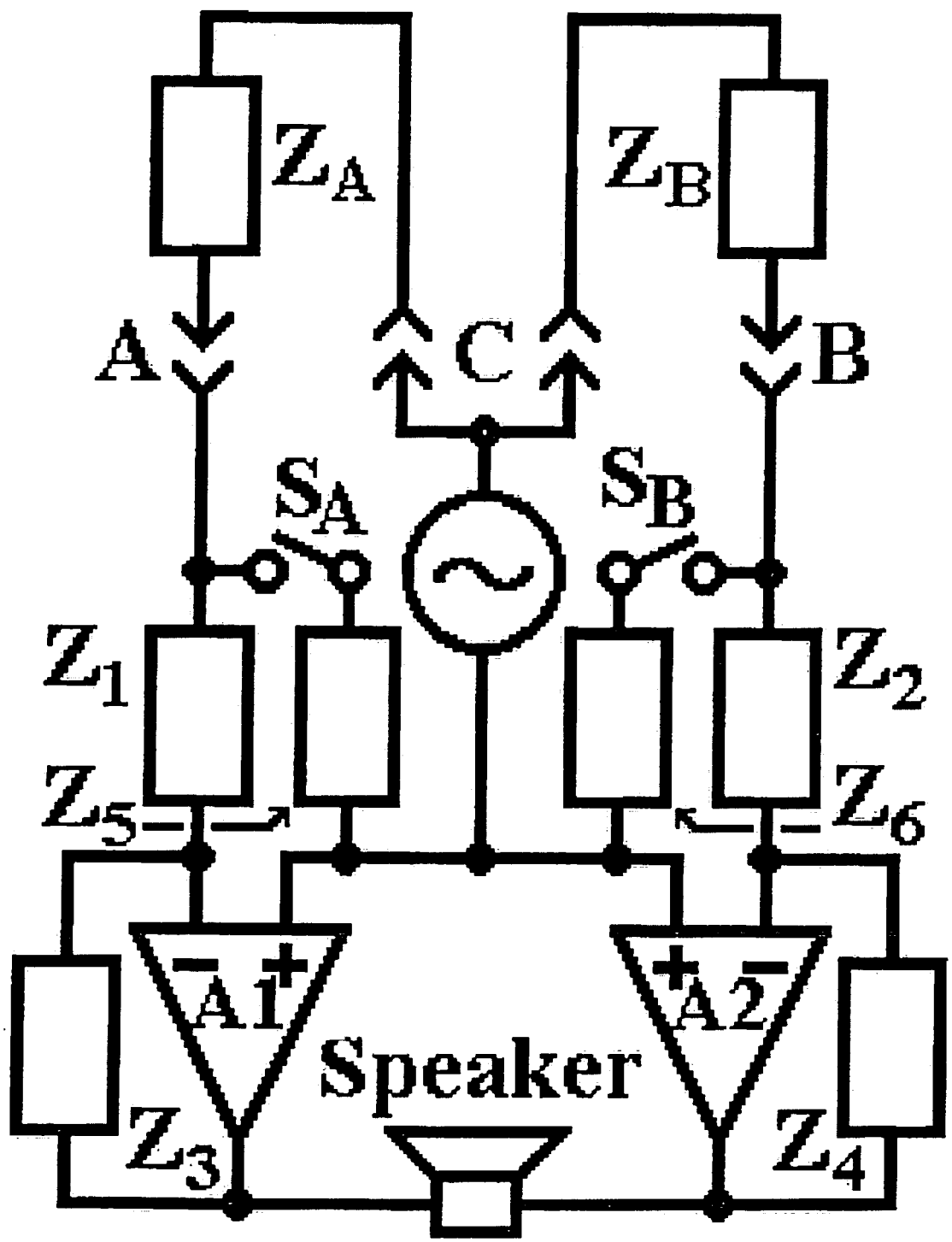

FIG. 9. Resistors 'R1' through 'R6' have been replaced with Impedances 'Z1' through 'Z6' to enhance specific characteristic differences of Compound Impedances.

Figure 10:
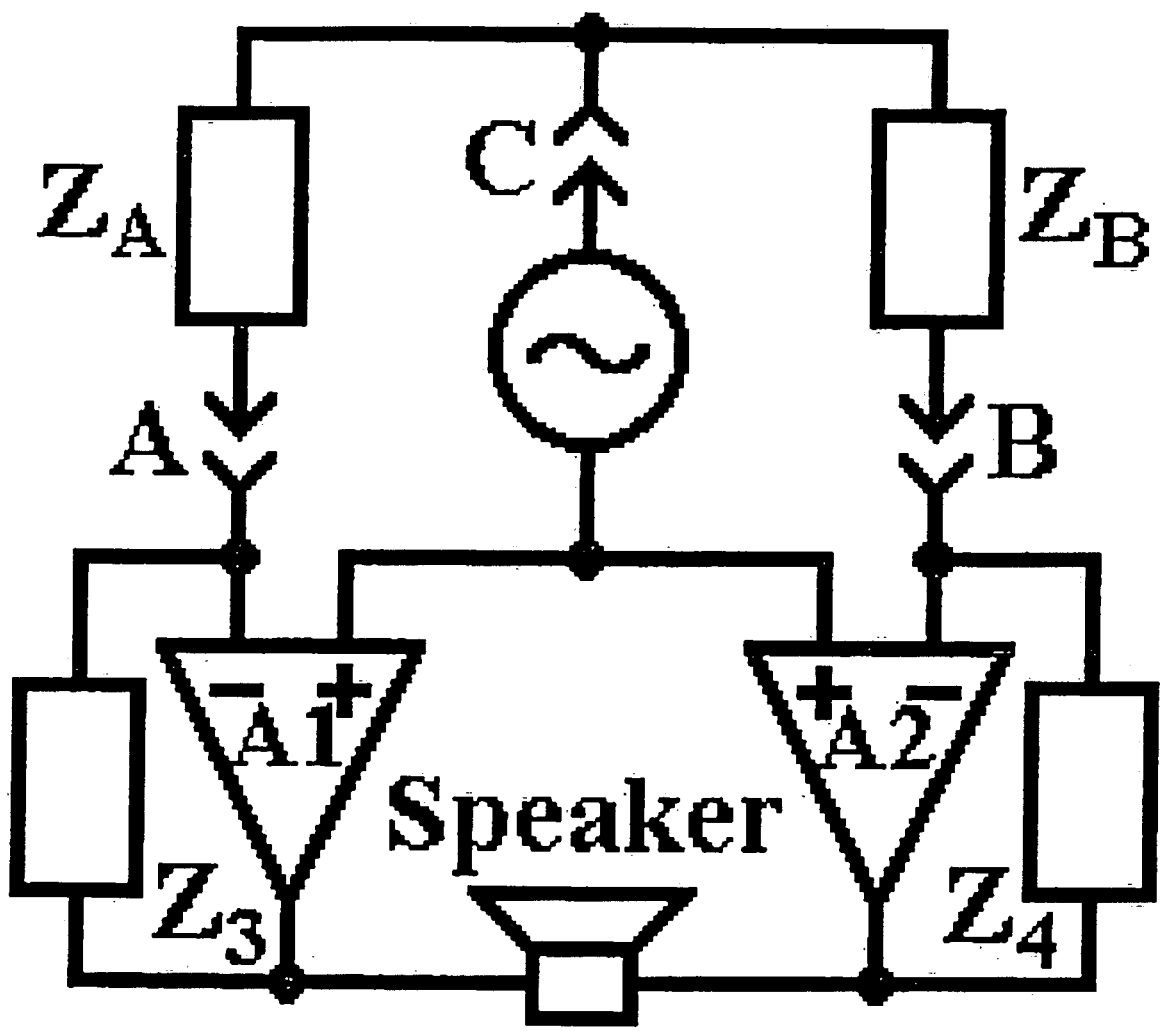

FIG. 10. Impedances 'Z1', 'Z2', 'Z5' and 'Z6' have been removed from the Circuit in FIG. 9 and the Unknown Impedances are connected directly to a variation of the Dynamic Impedance Comparator. This configuration makes the Unknown Impedances the sole Current (inversely proportional to the Impedance) determining factors in each half of the circuit, which in turn, is responsible for the Voltage across the Speaker.

Figure 11:
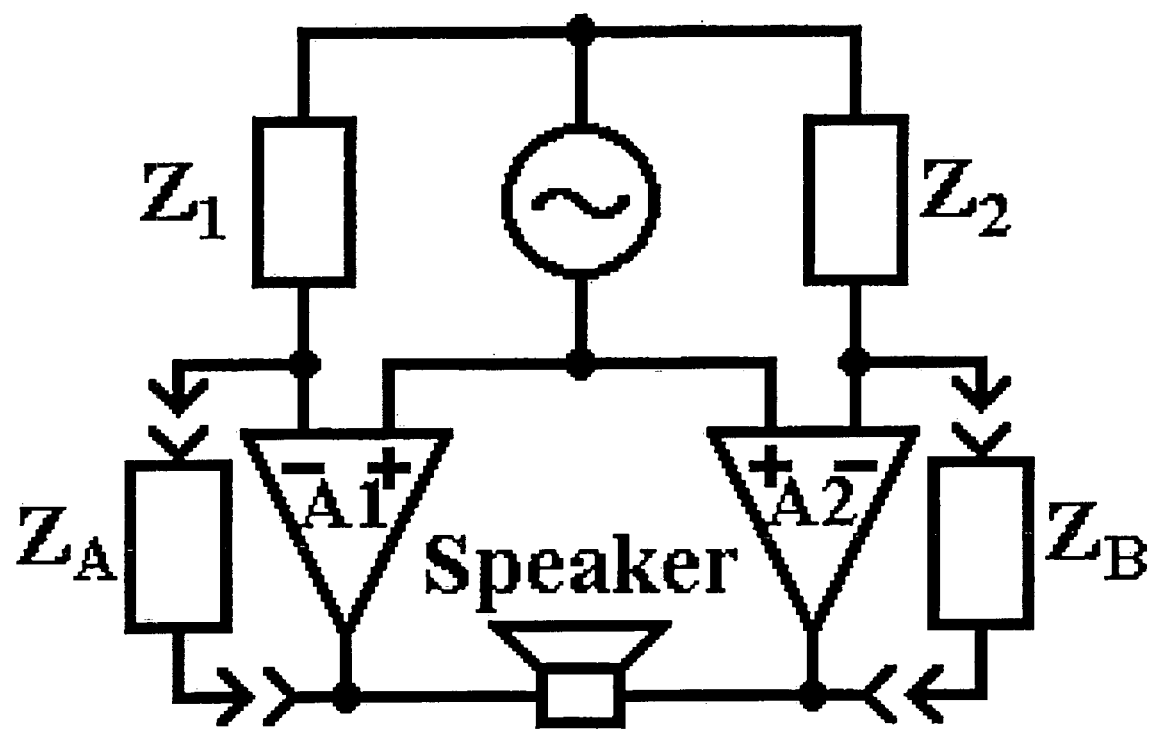

FIG. 11. NB. Impedances 'Z3' and 'Z4' are removed for simplicity. In this configuration, Impedances 'Z1' and 'Z2' form the Inputs to the Inverting Amplifiers. This configuration regulates the Currents to the Impedances 'ZA' and 'ZB' in another variation of the Dynamic Impedance Comparator. If 'Z1' and 'Z2' then the Currents will be equal causing the Voltage (directly related to current) across the Speaker, to be based solely on the Impedance difference between 'ZA' and 'ZB'.

Figure 12:
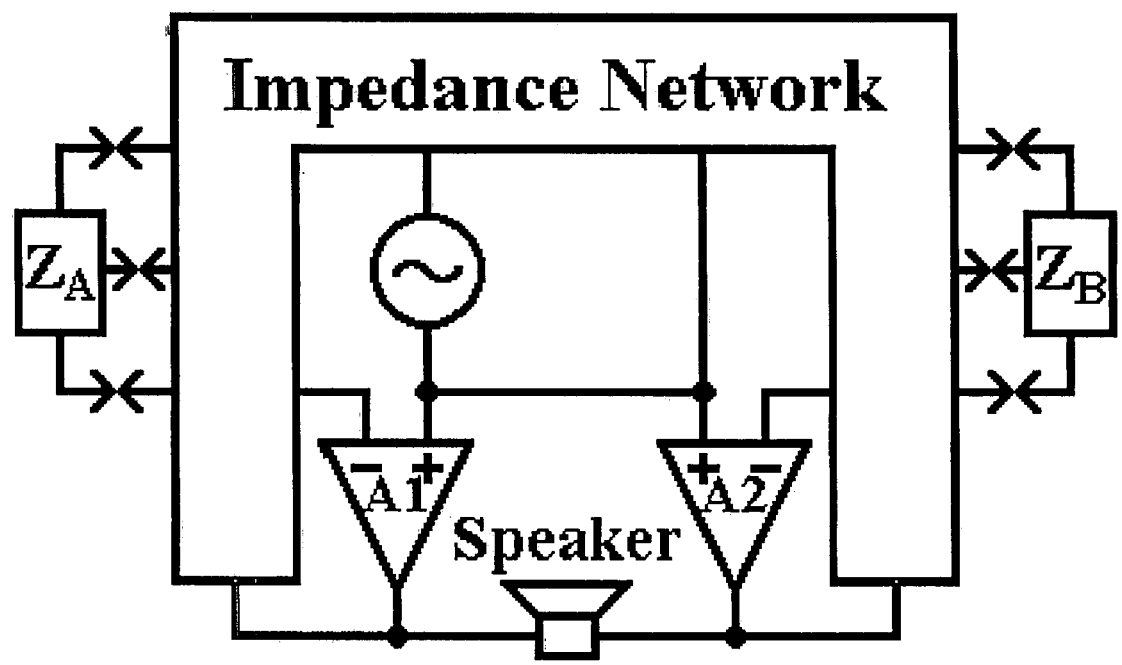

FIG. 12. Due to the numerous possible configurations, the Circuit is represented as an Impedance Network where the Unknown Impedances, are attached as components of the Network.

Figure 13:
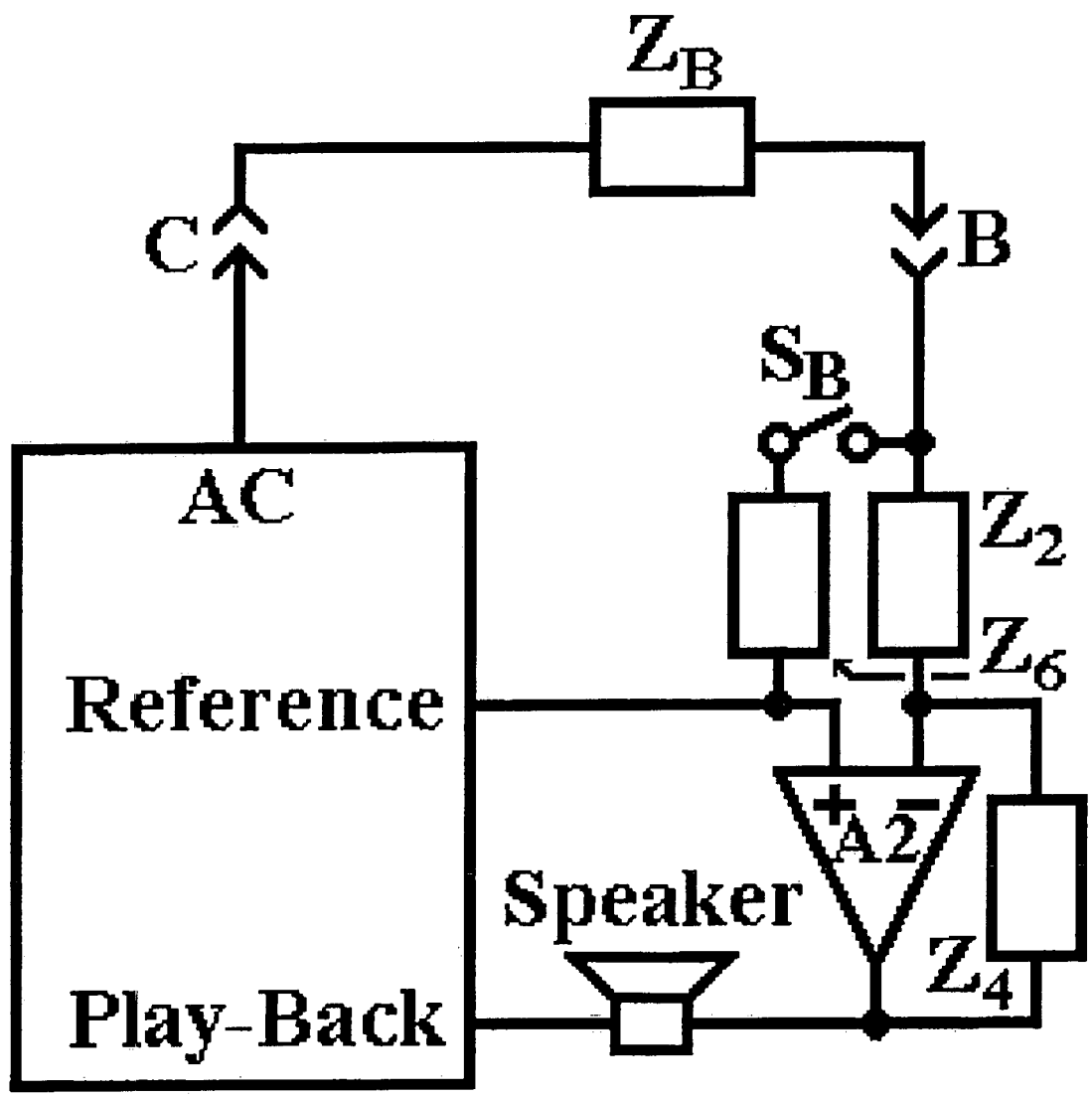

FIG. 13. For checks on Single Impedances, comparison may be made with Simulated or Pre-Recorded Signals.

SUMMARY OF MODIFICATIONS

Input Modifications include transducers to detect non electrical properties such as motion, light, sound, pressure.

AC Modifications include higher or lower power with variable, sweep, pulsed, intermittent, customised, higher than audible frequencies etc. Pre-Recorded 'AC' and Output Signal to be used as a reference for stand-alone checking.

Circuit Modifications higher or lower power/frequency handling amplifiers with customised Impedances.

Output Modifications include the replacement of the Speaker with amplifiers, attenuators, transducers, isolators, recorders, meters rectifiers, oscilloscopes, computers.

Configuration An inverting amplifier was only used to demonstrate the circuit, however, non-inverting or other configurations may also be used.

What is claimed is:

1. A testing system for measuring impedance, comprising:
    a) an AC signal for excitation of a subject impedance; and
    b) an adaptable reference comprising:
        i) a reference impedance,
        ii) a reference signal, wherein the reference signal comprises at least one of (1) a playback of a pre-recorded and signal and (2) a simulated signal,
    wherein the AC signal, the adaptable reference and the subject impedance are configured in a circuit to generate an output signal as a measure of the subject impedance, and wherein the output signal is proportional to an imbalance between the subject impedance and the reference impedance and/or reference signal.

2. The testing system of claim 1, wherein the output signal is expressed as an audible sound signal.

3. The testing system of claim 1, wherein the subject impedance is an active electrical/electronic system or sub-system, and wherein the testing system expresses a measure of a processing deviation of the AC signal in the active electrical/electronic system or sub-system via injection and tracing of the AC signal with respect to the adaptable reference.

4. A testing system for measuring a property of a subject element, wherein the property is a property selected from the group of electrical, electronic, impedance, transparency, reflectivity, structural, soundness, mass, shape and any combination thereof, the testing system comprising:
    a) an AC signal for excitation of a subject element; and
    b) an adaptable reference comprising:
        i) a reference element,
        ii) a reference signal, wherein the reference signal comprises at least one of (1) a playback of a pre-recorded signal, and (2) a simulated signal,
    wherein the AC signal, the adaptable reference and the subject element are configured in a circuit to generate an output signal as a measure of the property of subject element, and wherein the output signal is proportional to an imbalance between the subject element and the reference element and/or reference signal, wherein the testing system further comprises a transducer that is excited by the AC signal, and wherein the transducer is responsive to a form of energy selected from the group of electricity, light, sound, vibration, motion and any combination thereof.

5. The system of claim 4, wherein the testing system is configured for the measurement of structural integrity with respect to the adaptable reference, and wherein the system expresses the measure of the property as vibrational energy via the transducer.

6. The system of claim 4, wherein the testing system converts the AC signal to an energy form corresponding the transducer, wherein the subject element is an active electrical/electronic system or sub-system, and wherein the testing system expresses a measure of a processing deviation of the AC signal in the active electrical/electronic system or sub-system with respect to the adaptable reference, via injection and tracing of the AC signal in the converted energy form.

7. The testing system of claim 4, wherein the AC signal, the adaptable reference and the subject element are configured as a bridge circuit.

* * * * *